April 23, 1957 C. F. DOUGHERTY, JR 2,790,004
HYDROCARBON OXIDATION
Filed Oct. 27, 1949
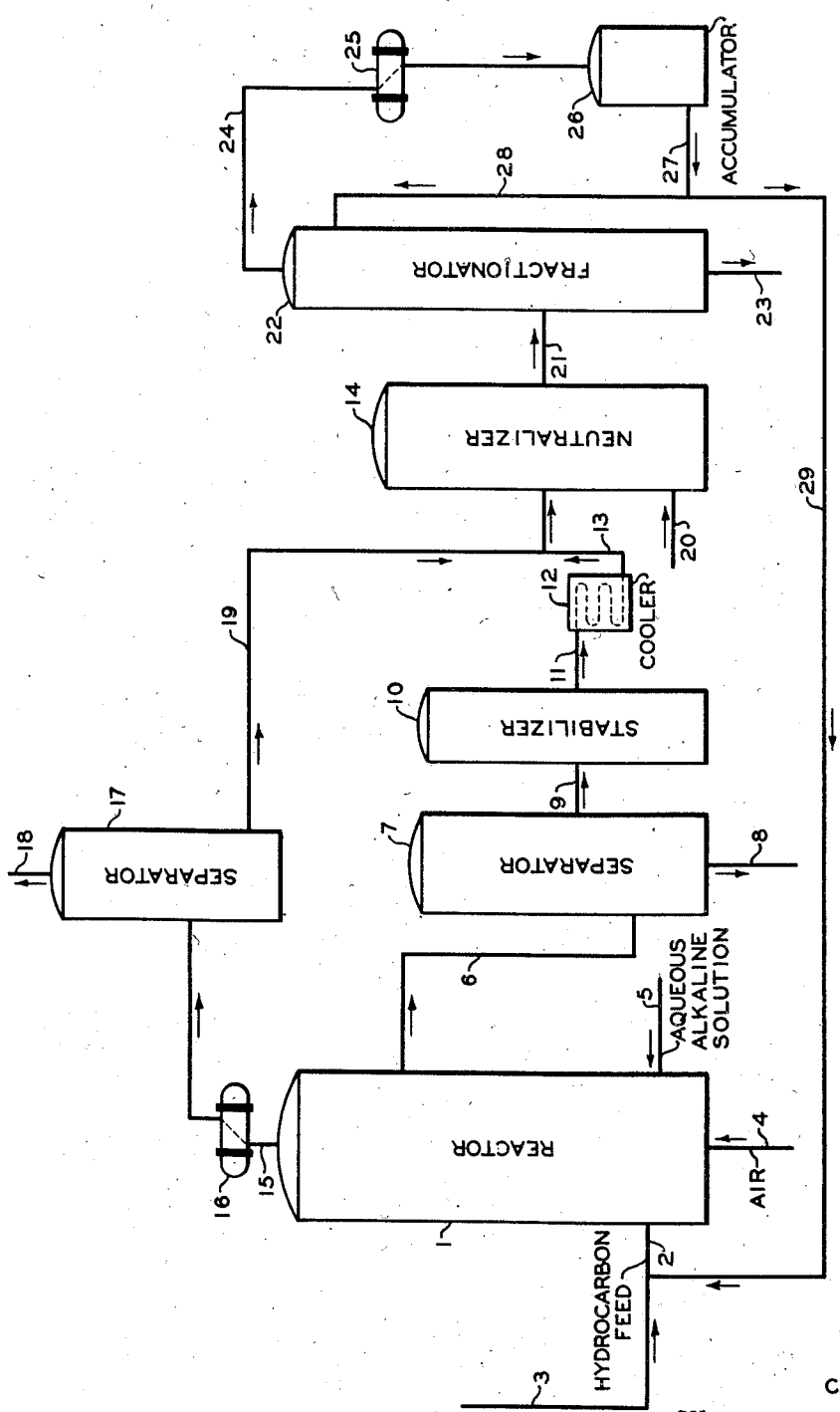
INVENTOR.
C.F. DOUGHERTY, Jr
BY
Hudson and Young
ATTORNEYS

United States Patent Office 2,790,004
Patented Apr. 23, 1957

2,790,004
HYDROCARBON OXIDATION

Charles Francis Dougherty, Jr., Bartlesville, Okla., assignor to Phillips Petroleum Company, a corporation of Delaware Application October 27, 1949, Serial No. 123,953

1 Claim. (Cl. 260—586)

This invention relates to the oxidation of hydrocarbons. In one aspect this invention relates to a novel process for the partial oxidation of various petroleum fractions. In a specific embodiment this invention relates to a novel process for the oxidation of naphthene-containing hydrocarbon fractions to yield alcohols and ketones.

Prior art processes have been disclosed for the preparation of alcohols and ketones by the partial oxidation of naphthenic hydrocarbons, but these processes present numerous disadvantages and difficulties which must be overcome before the processes can be regarded as commercially and economically feasible. Some of these disadvantages are relatively low yield of the desired oxidation products, resin formation and deposition of fatty acid salts which necessitate frequent costly shutdowns, and decomposition of intermediate reaction products to form products other than the desired alcohols and ketones. Obviously, a process which will eliminate difficulties of the prior art processes is highly desirable.

It is an object of this invention to eliminate difficulties which are known to exist in prior art processes for the partial oxidation of naphthenic hydrocarbons.

It is another object of this invention to provide a novel process for the partial oxidation of naphthenic hydrocarbons whereby improved yields of alcohols and ketones are obtained.

It is a further object of this invention to effect the partial oxidation of naphthenic hydrocarbons in the presence of an alkaline material whereby a portion of the acids formed during the oxidation reactions are neutralized.

Further and additional objects will be readily manifest from the disclosure of my invention hereinbelow.

I have found that difficulties encountered in prior art processes for the partial oxidation of naphthenic hydrocarbons can be avoided and improved results thus obtained by effecting the oxidation reaction in the presence of a quantity of alkaline material sufficient to react with only a portion of the acids produced during the reaction.

The hydrocarbons for effecting my process are termed generally naphthenic hydrocarbons, and, although I will describe my process in detail with methylcyclohexane, the scope of my invention should not be limited to this or any other specific hydrocarbon. The naphthenic hydrocarbons should contain no more than twenty carbon atoms per molecule. Specific hydrocarbons that may be used in my process include cyclobutane, cyclopentane, cyclohexane, cycloheptane, cyclooctane and their mono- and polysubstituted derivatives wherein the substituent groups may be alkyl, cycloalkyl, aryl and aralkyl. Typical examples of these substituent groups are methyl, ethyl, propyl, butyl, pentyl, and the like, cyclopropyl, cyclobutyl, cyclopentyl, cyclohexyl, and the like, phenyl, benzyl, tolyl, xylyl, and the like. Either one or combinations of two or more of the substituent groups may be present in the hydrocarbon employed. Also, the hydrocarbon employed may be a condensed ring naphthene. Typical examples of this type of hydrocarbon are bicyclo-(0,1,3)-hexane, bicyclo-(1,1,3)-heptane and bicyclo-(0,2,4)-octane, and these condensed rings may have attached thereto substituent radicals, such as the alkyl, cycloalkyl, aryl and aralkyl groups enumerated above or combinations of two or more of these groups.

Each of the hydrocarbons, indicated above, may be employed as the feed for my process or mixtures of two or more of these naphthenic hydrocarbons may be used. Also, fractions of straight-run gasolines which contain relatively high percentages, say, about 30 percent or higher, of naphthenic hydrocarbons may be oxidized to form alcohols and ketones in accordance with my process.

The oxidizing medium for my process is an oxygen-containing gas, such as air, and the molar ratio of oxygen to hydrocarbon is within the range of 0.05 to 0.3, preferably from 0.07 to 0.2. The reaction temperature for my process is within the range of 230 to 450° F., however, in order to produce an oxidate comprising a mixture of hydroperoxides, alcohols and ketones from $C_5$ to $C_8$ naphthenic hydrocarbons and their alkyl substituted derivatives, the preferable reaction temperature is above 300° F. and within the range of 320 to 370° F. If it is desired to produce an oxidate comprising essentially hydroperoxide, it is preferred to decrease the reaction temperature to within the range of 230 to 300° F. and concomitantly to increase the residence time. The operating pressure is at least sufficient to maintain liquid phase within the reaction zone. Specifically, the pressure for the reaction will fall within the range of 50 to 3,000 pounds per square inch, preferably 150 to 500 pounds per square inch. The liquid residence time within the reactor or the reaction contact time ranges from 1 to 60 minutes, preferably from 2 to 15 minutes.

In my process the oxidation reaction is effected in the presence of a sufficient quantity of an alkaline material to react with and thus neutralize only a portion of the acids formed during the reaction. During the course of the oxidation reaction a hydrocarbon soluble phase and a hydrocarbon insoluble phase are formed, and products of the reaction are found in each phase. In the hydrocarbon insoluble phase are found high-boiling carboxylic acids, polymers, resins and the like, and in the hydrocarbon soluble phase are found low-boiling, relatively volatile carboxylic acids, alcohols, ketones and hydroperoxides which are intermediate compounds for the desired reaction products, viz. alcohols and ketones. Unless secondary reactions are inhibited, the acids in the hydrocarbon phase will catalyze the decomposition of hydroperoxides to increase the yield of undesired high-boiling carboxylic acids, tars and polymers, and, as a consequence, the yield of alcohols and ketones that can be obtained from my process is correspondingly decreased. Therefore, I introduce to the oxidation reaction a sufficient quantity of an alkaline material to react with the carboxylic acids in the hydrocarbon soluble phase, and in this manner I prevent the undesired catalytic effect on the hydroperoxides.

It is essential to my process that the quantity of alkaline material that is introduced to the reaction be no greater than the quantity required to neutralize the acids in the hydrocarbon soluble phase. If an excess of this quantity of alkaline material is used, the excess alkaline material reacts with the high-boiling acids in the hydrocarbon insoluble phase and the salts resulting therefrom settle out and necessitate a cessation of the process at frequent intervals. The excess alkaline material also reacts with the hydroperoxides, thus reducing the yield of alcohols and ketones obtainable from the process. For example, if sodium hydroxide is used as the alkaline material, the sodium replaces the hydrogen in the hydroperoxide group, and the resulting compound is found in the hydrocarbon insoluble phase of the process.

The actual quantity of alkaline material that is used in my process is variable, and it is dependent upon the conditions at which the oxidation reaction is effected since the amount of acid to be neutralized is also dependent upon the same conditions. I employ a quantity of alkaline material which will react with and neutralize the acids in the hydrocarbon soluble phase. These acids are mainly formic acid and acetic acid, along with some propionic acid and butyric acid. The higher-boiling organic acids are found in the hydrocarbon insoluble phase, but in my process a reaction between the higher-boiling acids and the alkaline material is avoided in order to prevent salt deposition. Specifically, the amount of alkaline material that is employed is within the range of 0.05 to 0.3 percent by weight based on the hydrocarbon charged. In my process the total amount of alkaline material is consumed in the neutralization of the low-boiling organic acids, and no alkaline material is present in the oxide from the oxidation reaction.

Since the alkaline material neutralizes only a portion of the organic acids, the pH of the oxidate is maintained below 7.0. However, the pH of the oxidate is also maintained above 5.0, but, if operating conditions are employed which tend to produce relatively large amounts of high-boiling organic acids, such as those that are found in the hydrocarbon insoluble phase, the pH of the oxidate may drop below 5.0.

To neutralize the acids in the hydrocarbon soluble phase I use any alkaline material that will react with the organic acids to be neutralized. The preferred alkaline materials are the oxides, hydroxides, carbonates and bicarbonates of the alkali and alkaline earth metals. Typical examples of the compounds that may be used are sodium hydroxide, potassium hydroxide, calcium hydroxide, magnesium hydroxide, barium hydroxide, calcium oxide, magnesium oxide, potassium carbonate, potassium bicarbonate, calcium carbonate, calcium bicarbonate, and the like. In addition to these compounds other alkaline agents, such as the oxides, hydroxides, carbonates and bicarbonates of metals, such as zinc, cadmium, iron, cobalt and nickel, may also be employed in my process. The alkaline material is introduced to the reaction in any suitable manner, such as in an aqueous solution containing from 1 to 50, preferably from 5 to 20, percent by weight of the alkaline material. The amount of alkaline material that is used is no greater than the amount required to neutralize the strong, volatile, organic acids in the hydrocarbon soluble phase, and no alkaline material is present in the oxidate from the partial oxidation reaction.

Although in my process aqueous alkaline solutions containing as low as 1 weight percent alkaline material may be employed, excessive quantities of water in the reaction mixture cannot be tolerated. Sufficient water should be added with the alkaline material to dissolve the salts that result from the neutralization reaction, and this water causes the formation of an emulsion within the reaction zone. Within the limits I have disclosed for my process the emulsion is a "water-in-oil" emulsion, and sufficient water should not be present to form an "oil-in-water" emulsion. In an "oil-in-water" emulsion the hydrocarbon phase is discretely dispersed throughout the aqueous phase, and the emulsion, in a short period of time, builds up in the oxidation reactor causing an almost complete cessation of reaction.

During the oxidation reaction hydroperoxides, alcohols and ketones are formed. The hydroperoxides may be recovered as products of the reaction or the hydroperoxides may be permitted to decompose or to undergo further reaction with the naphthenic hydrocarbons to form additional quantities of the alcohols and ketones. The hydroperoxides are highly explosive and care must be exercised in handling and recovering these compounds. In my process I pass the oxidation products, containing the hydroperoxides, alcohols and ketones, from the oxidation zone to a stabilizing or deperoxidizing zone where the hydroperoxides form alcohols and ketones. In the stabilizing zone the oxidation products as permitted to soak at a temperature and pressure similar to that at which the oxidation reaction is effected for a period of 30 minutes to 5 hours, preferably 2 hours, to convert the hydroperoxides to alcohols and ketones. Alternatively, an aqueous solution of a reducing agent, such as ferrous sulfate, may be used in the stabilizing zone to deperoxidize the hydroperoxides. If any organic acids or alkaline agent is present in the stabilizing zone, the hydroperoxides will react with these compounds, and accordingly, the yield of alcohols and ketones will be reduced. I effect my process in such a manner that the stabilizing zone is free of organic acids and alkaline compounds.

The accompanying drawing is a schematic drawing of one method for effecting my process. In order that my process can be readily understood, such conventional equipment as pumps, valves, compressors, and the like has not been included in this drawing, but the inclusion of such equipment is believed to be well within the scope of my invention. Referring now to the drawing, reactor 1, provided with means not shown for stirring and agitating the contents thereof, was charged via line 2 with a methylcyclohexane concentrate containing 93 mol percent methylcyclohexane via line 3. Air was introduced to reactor 1 via line 4, and an aqueous solution containing 12 weight percent potassium carbonate was admitted via line 5. The rate of flow of hydrocarbon via line 2 was 26.2 pounds per hour; the rate of flow of air via line 4 was 3.95 pounds per hour; and the rate of flow of aqueous potassium carbonate solution via line 5 was equivalent to 0.04 pound of the dry salt per hour. The liquid residence time within the reactor was 6 minutes. The temperature within reactor 1 was maintained at $350 \pm 2°$ F., and the pressure was maintained at 500 p. s. i. g. The liquid phase was removed from reactor 1 via line 6 to separator 7 where the hydrocarbon soluble and hydrocarbon insoluble phases were permitted to separate, and the hydrocarbon insoluble phase, which is the aqueous phase and contains high-boiling fatty acids, was withdrawn via line 8. The hydrocarbon soluble phase which contained, in addition to unoxidized hydrocarbon, alcohols, ketones and hydroperoxides was passed via line 9 to stabilizer 10 where intermediate hydroperoxides were decomposed to supplement the yield of alcohols and ketones formed during the oxidation step. Stabilizer or deperoxidizer 10 was operated at the same temperature and pressure as reactor 1. The effluent from stabilizer 10 was withdrawn via line 11 and passed via cooler 12 and line 13 to neutralizer 14.

The gaseous phase from reactor 1 was withdrawn via line 15 and condenser 16 into separator 17 from which waste gas was passed into the atmosphere via line 18. Condensed liquid was passed from separator 17 via line 19, and it entered neutralizer 14 via line 13 with the effluent from stabilizer 10. Sufficient potassium carbonate in an aqueous solution was introduced to neutralizer 14 via line 20 to react with and to neutralize any acids present therein. In place of potassium carbonate I could have used any of the alkaline compounds that have been enumerated hereinabove. The acid-free liquid from neutralizer 14 was passed via line 21 to fractionator 22 from which oxidation products, methylcyclohexanols, methylcyclohexanones, 2-heptanone and water, were withdrawn as kettle product via line 23. Unreacted methylcyclohexane was stripped off and taken overhead via line 24 and condenser 25 into accumulator 26. A portion of the methylcyclohexane in accumulator 26 was returned to fractionator 22 as reflux via lines 27 and 28, and the remainder of the methylcyclohexane from accumulator 26 was recycled to reactor 1 via lines 27, 29 and 2.

When operating in the manner and at the conditions named in my description of the accompanying drawing, I obtained an 85 weight percent yield of combined methylcyclohexanols, methylcyclohexanones, and 2-heptanone and a productivity of 8.1 gallons of alcohols and ketones per gallon of reactor capacity per day. When using an amount of potassium carbonate in reactor 1 in excess of 0.3 weight percent based on the methylcyclohexane charged, and specifically in amounts of at least 0.5 weight percent, the heavy deposit of salts within the reactor and the emulsion resulting from the presence of excessive quantities of water which gradually filled the reactor necessitated a cessation of the operation after only two hours of continuous operation.

The alcohols and ketones that result from my process correspond to the naphthene hydrocarbon or hydrocarbons charged to the oxidation reactor. For example, when methylcyclohexane is oxidized, methylcyclohexanols and methylcyclohexanones are produced and some 2-heptanone also results from the oxidation. Similarly, when other naphthene hydrocarbons are oxidized, the corresponding alcohols and ketones are produced.

I have described my process essentially as an operation for the production of alcohols and ketones, but the process can also be used to produce hydroperoxides as one of the main products of the process. In this modification of my process, it is merely necessary to dispense with the operation of stabilizer 10. Then, hydroperoxides produced during the oxidation step remain unreacted or undeperoxidized in the oxidate from reactor 1 along with the alcohols and ketones also produced therein. The hydroperoxides are then recovered as products of the reaction.

While I have described my invention as applicable principally to the oxidation of naphthenic hydrocarbons, actual experimental work has shown that my process, as described hereinabove, can also be used to oxidize aromatic hydrocarbons usually those hydrocarbons containing no more than 20 carbon atoms per molecule. Specific aromatic hydrocarbons that can be oxidized are cyclohexylbenzene, diisopropylbenzene and tertiary butyl isopropylbenzene, but other aromatic hydrocarbons can be similarly oxidized. In order to obtain the corresponding hydroperoxides as primary products of the reaction, the oxidation is effected at a temperature within the range of 230 to 300° F.

From my detailed disclosure numerous modifications and variations within the scope of my process will be apparent to those skilled in the art.

I claim:

A process for preparing oxidation products of methylcyclohexane comprising introducing said methylcyclohexane into a reaction zone at a rate of approximately 26 pounds per hour; introducing air into said reaction zone in an amount of approximately 3.95 pounds per hour; introducing an aqueous potassium carbonate solution into said reaction zone in a rate equivalent to 0.04 pound of the dry salt per hour; maintaining reaction conditions of approximately 350° F. and a pressure of approximately 500 p. s. i. g.; and recovering, after a liquid residence time of approximately six minutes, the oxidation products of said methylcyclohexane, these comprising methylcyclohexanols, methylcyclohexanones, and 2-heptanone.

References Cited in the file of this patent

UNITED STATES PATENTS

| | | |
|---|---|---|
| 1,813,606 | Binapfl | July 7, 1931 |
| 2,223,494 | Loder | Dec. 3, 1940 |
| 2,380,675 | Rust et al. | July 31, 1941 |
| 2,430,865 | Farkas et al. | Nov. 18, 1947 |
| 2,438,125 | Lorand et al. | Mar. 23, 1948 |
| 2,447,400 | Emerson et al. | Aug. 17, 1948 |
| 2,447,794 | Brewer | Aug. 24, 1948 |
| 2,548,435 | Lorand et al. | Apr. 10, 1951 |